US008881233B2

(12) United States Patent
Chrysanthakopoulos et al.

(10) Patent No.: US 8,881,233 B2
(45) Date of Patent: Nov. 4, 2014

(54) RESOURCE MANAGEMENT VIA PERIODIC DISTRIBUTED TIME

(75) Inventors: Georgios Chrysanthakopoulos, Seattle, WA (US); Donald M. Gray, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 1998 days.

(21) Appl. No.: 11/135,134

(22) Filed: May 23, 2005

(65) Prior Publication Data
US 2006/0265738 A1 Nov. 23, 2006

(51) Int. Cl.
*H04L 29/06* (2006.01)
*H04L 12/26* (2006.01)

(52) U.S. Cl.
CPC .................................. *H04L 43/0817* (2013.01)
USPC ................ 726/3; 726/1; 726/2; 726/4; 726/5; 726/6; 713/320; 713/401; 713/503; 713/600; 713/601; 703/22

(58) Field of Classification Search
USPC ............. 726/1–6; 703/22; 713/320, 503, 401, 713/600, 601
See application file for complete search history.

(56) References Cited

U.S. PATENT DOCUMENTS

| 5,577,075 | A | * | 11/1996 | Cotton et al. | 375/356 |
| 5,826,239 | A | * | 10/1998 | Du et al. | 705/7.26 |
| 5,870,441 | A | * | 2/1999 | Cotton et al. | 375/354 |
| 5,898,870 | A | * | 4/1999 | Okuda et al. | 718/104 |
| 5,938,728 | A | * | 8/1999 | Dwork et al. | 709/222 |
| 5,978,576 | A | * | 11/1999 | Sanadidi et al. | 703/22 |
| 6,009,473 | A | * | 12/1999 | Lowe | 709/233 |
| 6,076,171 | A | * | 6/2000 | Kawata | 713/501 |
| 6,263,359 | B1 | * | 7/2001 | Fong et al. | 718/103 |
| 6,282,561 | B1 | | 8/2001 | Jones et al. | |
| 6,327,596 | B1 | * | 12/2001 | Wollrath et al. | 1/1 |
| 6,370,560 | B1 | * | 4/2002 | Robertazzi et al. | 718/105 |
| 6,438,670 | B1 | * | 8/2002 | McClannahan | 713/401 |

(Continued)

FOREIGN PATENT DOCUMENTS

| JP | 9-167141 A | 6/1997 |
| JP | 10-268963 A | 10/1998 |

(Continued)

OTHER PUBLICATIONS

Mills, David. "Internet Time Synchronization: The Network Time Protocol." IEE Transactions on Communications, vol. 39, No. 10, Oct. 1991.*

(Continued)

*Primary Examiner* — Luu Pham
*Assistant Examiner* — Kari Schmidt
(74) *Attorney, Agent, or Firm* — Dan Choi; Carole Boelitz; Micky Minhas

(57) ABSTRACT

Systems and methods for providing resource management in a distributed network are disclosed. A loose collection of devices in a network may not be aware of the power restrictions for other devices. Wall powered devices will generally have drastically different power settings than battery powered mobile devices. The invention provides a federation policy for time that can be used to slave to a local service responsible for understanding the local resource requirements of each device (or node) on the network. In such a distributed time system, all services in a particular time domain may be sped up, slowed down, or completely halted.

19 Claims, 6 Drawing Sheets

(56) References Cited

U.S. PATENT DOCUMENTS

| | | | |
|---|---|---|---|
| 6,661,810 B1* | 12/2003 | Skelly et al. ............... 370/516 |
| 6,735,709 B1* | 5/2004 | Lee et al. ................ 713/401 |
| 6,792,541 B1* | 9/2004 | Kusakabe et al. ............ 726/1 |
| 6,904,537 B1* | 6/2005 | Gorman .................. 713/401 |
| 7,111,297 B1* | 9/2006 | Sankaranarayan et al. ... 718/104 |
| 7,281,148 B2* | 10/2007 | Munguia ................. 713/322 |
| 7,325,050 B2* | 1/2008 | O'Connor et al. ........... 709/223 |
| 7,328,261 B2* | 2/2008 | Husain et al. ............. 709/224 |
| 7,337,333 B2* | 2/2008 | O'Conner et al. ........... 713/300 |
| 7,337,335 B2* | 2/2008 | Jorgenson et al. .......... 713/300 |
| 7,380,039 B2* | 5/2008 | Miloushev et al. ......... 710/244 |
| 7,500,152 B2* | 3/2009 | Moyer et al. .............. 714/45 |
| 7,530,072 B1* | 5/2009 | Cheaz .................... 718/104 |
| 7,698,705 B1* | 4/2010 | Czajkowski et al. ......... 718/1 |
| 8,345,546 B2* | 1/2013 | Chan et al. .............. 370/229 |
| 2002/0087675 A1* | 7/2002 | Yoshii et al. .............. 709/223 |
| 2003/0061514 A1* | 3/2003 | Bardsley et al. ........... 713/201 |
| 2003/0086515 A1 | 5/2003 | Trans et al. |
| 2003/0204759 A1* | 10/2003 | Singh .................... 713/320 |
| 2005/0066336 A1 | 3/2005 | Kavoori et al. |
| 2005/0143865 A1* | 6/2005 | Gardner ................. 700/291 |
| 2005/0154576 A1* | 7/2005 | Tarui et al. ............... 703/22 |
| 2005/0235285 A1* | 10/2005 | Monasterio ............... 718/100 |
| 2006/0026268 A1* | 2/2006 | Sanda .................... 709/221 |
| 2008/0240281 A1* | 10/2008 | Gaal et al. ............... 375/267 |
| 2011/0185216 A1* | 7/2011 | Zhao et al. .............. 713/401 |

FOREIGN PATENT DOCUMENTS

| | | |
|---|---|---|
| JP | 2002-71219 A | 3/2002 |
| JP | 2004-246862 A | 9/2004 |
| JP | 2005-196601 A | 7/2005 |

OTHER PUBLICATIONS

Park et al. "SensorSim: A simulation framework for sensor networks." Proceedings of the 3rd ACM international workshop on Modeling, analysis and simulation of wireless and mobile systems. pp. 104-111. ACM, 2000.*

Zeng et al. "Experiences in managing energy with ecosystem." Pervasive Computing, IEEE 4.1 (2005): pp. 62-68.*

"Office Action Received in Korea Patent Application No. 10-2007-7026784", Mailed Date: Oct. 25, 2013, Filed Date: Apr. 14, 2005, 11 pages.

* cited by examiner

| | | | | | | |
|---|---|---|---|---|---|---|
| C | | C | | C | | C |
| | D | | | | D | |
| C | | C | | C | | C |
| | | E | | E | | |
| C | | C | | | | C |
| | D | | | | D | |
| C | | C | | C | | C |

FIG. 4A — SVC C, SVC D, SVC E, Sequence, Δt

FIG. 4B — SVC C, SVC D, SVC E, Sequence, Δt

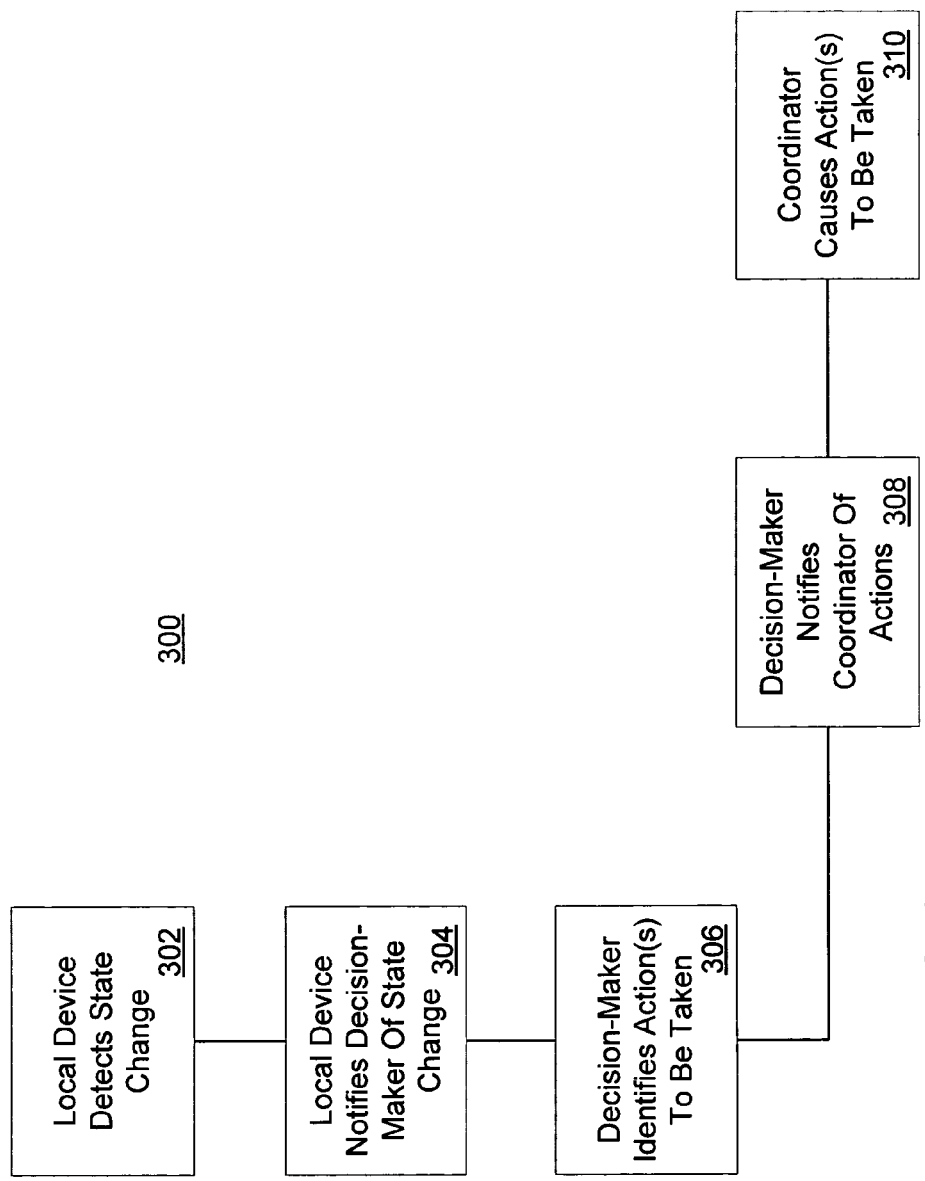

RESOURCE MANAGEMENT VIA PERIODIC DISTRIBUTED TIME

CROSS-REFERENCE TO RELATED APPLICATIONS

The subject matter disclosed and claimed herein is related to the subject matter disclosed and claimed in the following U.S. patent applications: U.S. patent application Ser. No. 11/001,100, filed on Dec. 1, 2004, entitled "Distributed Debugger Environment;" U.S. patent application Ser. No. 10/856,399, filed on May 27, 2004, entitled "Web Service Application Protocol And Soap Processing Model;" U.S. patent application Ser. No. 11/110,128, filed on Apr. 20, 2005, entitled "Systems And Methods For Providing Distributed, Decentralized Data Storage And Retrieval;" and U.S. patent application Ser. No. 09/836,834, filed on Apr. 17, 2001, entitled "Methods And Systems For Distributing Multimedia Data Over Heterogeneous Networks." The disclosure of each of the above-referenced U.S. patent applications is hereby incorporated herein by reference.

FIELD OF THE INVENTION

Generally, the invention relates to systems and methods for providing resource management in a distributed network. More particularly, the invention relates to systems and methods that employ a federation policy for time that can be used to slave to a service responsible for understanding the local resource requirements of a network node.

BACKGROUND OF THE INVENTION

A loose collection of devices in a network may not be aware of certain restrictions on other devices on the network. For example, wall-powered devices may have drastically different power settings than battery-powered, mobile devices. When these devices interact, however, there is no architecturally consistent way for a device to speed up or slow down based on the power consumption settings on a remote service.

For example, a wall-powered device may need to throttle down the amount of work sent to a battery-powered device because every packet sent would require the limited battery of the remote device to expend more radio power and CPU energy. Likewise, a battery powered device may wish to offload computation or storage to another device because it would cost too much (in terms of energy consumption) to perform the computational work locally.

It would be desirable, therefore, if systems and methods were available for managing resources, such as battery life, bandwidth utilization, and processing power, among the several nodes that form a distributed network.

SUMMARY OF THE INVENTION

The invention provides systems and methods for managing device resources in a distributed network. Examples of such resources may include, battery life, network bandwidth, CPU utilization, etc. In particular, the invention provides a distributed and federated way to manage such resources across a network of devices (each of which may be considered a network node). The term "federated," as used herein, refers to a system wherein devices may be controlled locally, but also pooled in some central fashion where several devices have some commonality.

In such a system, a federation policy for time can be used to slave to a local service that is responsible for understanding the requirements of the device. Such a federation policy for time has been previously disclosed. U.S. patent application Ser. No. 09/836,834, for example, discloses and claims a distributed time system in which multiple devices or services can be slaved to one master clock. In such a distributed time system, all services in a given time domain may be sped up, slowed down, or completely halted. Signal sources, such as clock ticks, for example, may be sent as periodic events that govern how fast a service may run. Slaving multiple services to one distributed clock may enable a number of services in that time domain to run in a lockstep fashion, even at fractional or zero speed.

In addition, a "leaseholder" service may be provided in which services can be granted "leases" for a given time duration. If a service does not renew its lease once it expires, the service can be presumed dead and garbage-collected from other nodes' lists of available remote services. According to an aspect of the invention, device resources may be managed while at the same time ensuring that leases do not expire prematurely because different time domains are being employed.

In accordance with the invention, a local device can affect the behavior of control one or more local or remote services, based on a current policy or current state of the local device, in order to manage one or more resources of the local device. To manage battery life, for example, power utilization may be controlled. To manage network bandwidth, for example, packet bandwidth may be managed. To manage CPU utilization, for example, work item scheduling and power utilization may be controlled. Thus, a local device may cause a tine service and leaseholder service to alter (i.e., slow down, speed up, or stop) incoming message traffic in order to control battery power or CPU, or to alter (i.e., decrease or increase) I/O bandwidth in order to manage network bandwidth.

Certain I/O patterns may be slaved to a local device's power state or power policy. Such I/O patterns may include scheduling of work items, liveness rates (or any periodic signaling of leaseholder services), memory allocation rates (and also how long that memory stays alive), and I/O rates for boundary transport services (i.e., services that actually use hardware to get I/O in and out of the system, such as network controllers and the stack on top of them, serial bus controllers, etc.).

A example system according to the invention may include a distributed clock service and a resource utilization coordinator. The distributed clock service maintains respective time domains, each of which may be associated with a particular resource or activity. The resource utilization coordinator causes the distributed clock service to alter at least one of the time bases in order to alter a rate at which a resource is utilized by a device on the network.

BRIEF DESCRIPTION OF THE DRAWINGS

FIGS. 4A and 4B depict timing events managed by a sequencer.

FIG. 6 is a flowchart of an example method for managing device resources in a distributed network.

DETAILED DESCRIPTION OF ILLUSTRATIVE EMBODIMENTS

Example Computing Environment

Figure 1:
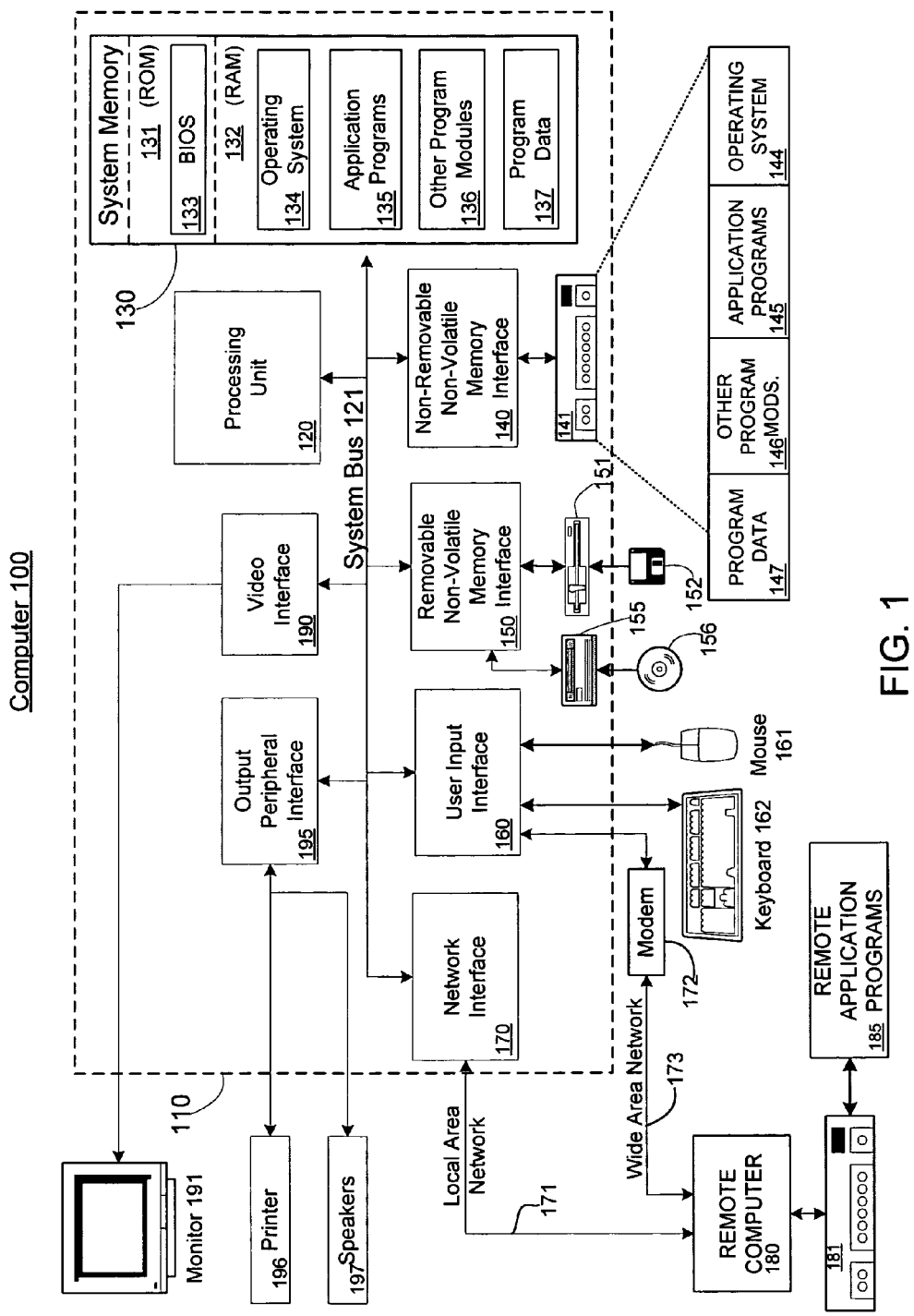
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web. It should also be understood that such a computing device need not have any direct human interface, and may be accessible only via a network.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Distributed Network

Figure 2:
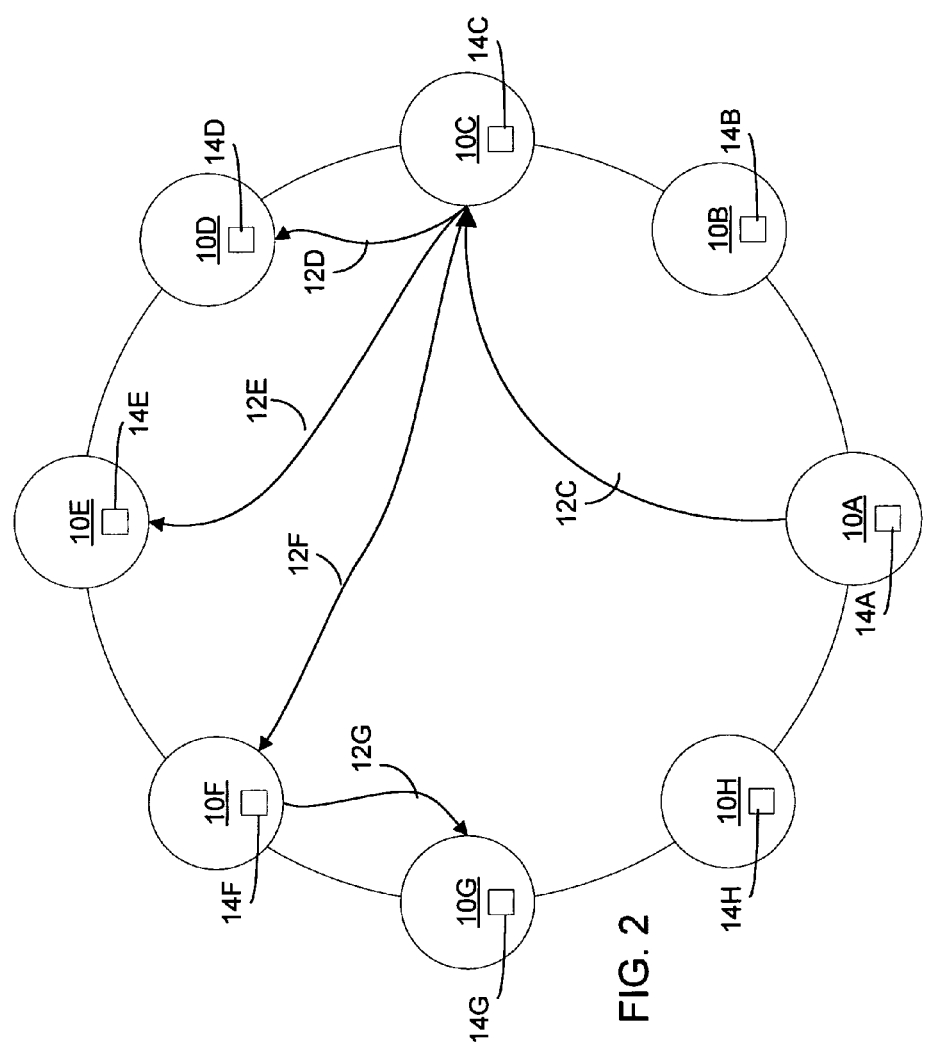
FIG. 2 depicts an example of a distributed network.

FIG. 2 depicts an example of a distributed network comprising a plurality of network nodes 10A-H. Such a node may be a personal computer, for example, or any other network device that includes processing and data storage capabilities, such as, for example, a server, a router, a network PC, a peer device, etc. The nodes 10A-H may be peers that are interconnected to one another over a local- or wide-area-network such as an intranet or the Internet, for example.

Each node 10A-H may be assigned a unique address. The length of the address may be chosen in order to ensure that each node has a unique address. In an example, Internet-based system, where the network is expected to include tens of millions of nodes, 160-bit addresses may be used. Such an addressing scheme may form a routing overlay on top of the transmission control protocol ("TCP").

Processes distributed among the several nodes 10A-H may communicate with each other over the network via simple object access protocol ("SOAP") messages. SOAP is a well-known, lightweight, XML-based distributed computing protocol. A SOAP message is an XML document that includes a SOAP envelope. The envelope includes an optional SOAP header and a mandatory SOAP body. The SOAP message header represents the metadata of the message and provides a way to extend SOAP. The SOAP message body is the actual message payload. The distributed processes may communicate with one another by putting SOAP packets onto the network.

A process may be a message originator (e.g., on node 10A as shown), an intended message receiver (e.g., on node 10G as shown), or an intermediary (e.g., on node 10C as shown). The message originator is the process that originally puts the SOAP message onto the network. The intended message receiver is the process to which the message is ultimately destined. Accordingly, a SOAP message originating from the message originator may include an address associated with the intended message receiver.

Distributed Time Management

Figure 3:
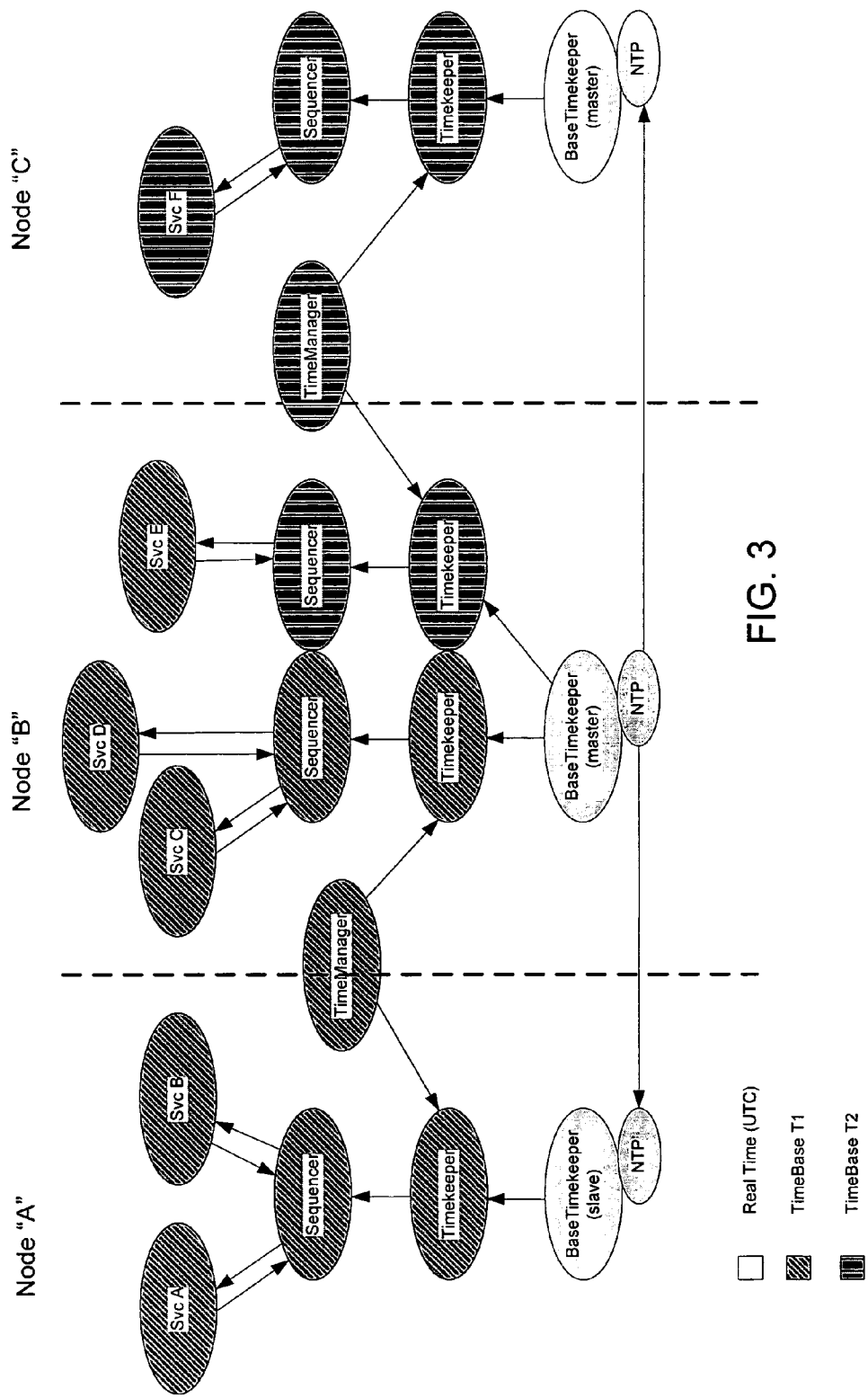
FIG. 3 depicts time services that maybe employed in a distributed network environment.

FIG. 3 depicts a distributed clock service wherein time services may be employed in a distributed environment. Aspects of such a distributed clock service may be integrated within service code on any or all of the several network nodes such that multiple distributed services can be affected in a uniform fashion. As shown, each node may have a base timekeeper service as a core service. The base timekeeper may be a service that manages real time in a node using NTP. A base timekeeper may track "real time," which may be time-zone independent (e.g., Universal Time Code—UTC).

If a node is in isolation, the concept of time may be the local machine system clock. If a node is part of an active ring, a base timekeeper master may be chosen using a server election process based upon which has the highest timing accuracy. The network time protocol (NTP), is used for synchronizing nodes. The NTP algorithm may then be used to synchronize all base timekeepers on the same ring.

In an example embodiment, the base timekeeper may be initially isolated and self-running, using local machine UTC. While in the isolated state, the base timekeeper may periodically attempt to search for other nodes. When other nodes are discovered, the base timekeeper may engage in a server election process with the other nodes to determine which node's base timekeeper is the best time master. If this node is joining a mature ring (e.g., a ring having more than two nodes populated and running), a base timekeeper master may already exist. In this case, the server election process may still run, but there is a diminishing likelihood that the current master will be unseated as more nodes join the ring.

Every node may have at least one timekeeper service that tracks a particular "time domain" on the node. A time domain is a representation of time that is relative to real time. It may be faster than, slower than, or the same as real time. It may be paused or adjusted. Time domains may be used whenever a unique concept of time passage is desired. For example, a time domain may be created to manage usage of a particular resource. A single time domain may be of interest to a number of nodes. Also, a single node may be interested in a number of time domains. Accordingly, a node may have more than one timekeeper. For accurate local timing, a respective timekeeper may be created within a node for every time domain of interest to the node. The timekeeper services may expand upon the features of the base timekeeper by permitting timing adjustments for debugging or other purposes. The timekeeper state may include values that specify the linear relationship between the timekeeper and real time (as represented by the local base timekeeper).

A "sequencer" is a service that schedules timing events within a node for a given time domain. If several entities in a node are using the same time domain, and desire periodic notification, the sequencer may provide this functionality by interacting with the appropriate timekeeper(s). Different time domains may require different sequencers. A sequencer may compose with the timekeeper and serve as a common service for periodic and non-periodic alerts. Other services may compose with the sequencer to manage timeouts and other timing signals. The sequencer service may query the associated timekeeper (i.e., the timekeeper that represents the desired time domain) to learn the current time. To generate an expiration alert, the sequencer may subscribe to the associated timekeeper. In this fashion, timing events may be managed by the sequencer, while the progression of time is controlled by the underlying timekeeper.

A time manager is a service that may be responsible for managing a time domain across multiple nodes. A time manager may maintain one or more groups of time keepers that subscribe to a given time domain. All timekeepers on a ring may be in the same group. In certain cases, however, it may be desirable to manage separate time domains. Thus, time may be slowed down, halted, or even reversed across machines. Only one time manager may be required per time domain.

In the example depicted in FIG. 3, two nodes (designated "A" and "B") are enlisted in one time domain, with the timekeeper in node B being the master and the timekeeper in node A being the slave. A third node (designated "C") maintains a separate time domain. Though not shown explicitly in FIG. 3, it should be understood that a single node can instantiate multiple timekeepers and sequencers, if desired.

To support message playback, all messages may be timestamped. The timestamp may be generated from the base timekeeper, as this may be the true representation of message ordering. Accordingly, multiple CPUs may be slaved to one distributed master clock so that timestamps across machines can be rationalized. Otherwise, clock drift between machines could make comparison of time traces non-useful.

FIGS. 4A and 4B depict the operation of a sequencer. As shown in FIG. 4A, one or more services (e.g., SVC C, SVC D, and SVC E) may utilize the same sequencer. As shown, SVC C sends a message once every other clock tick ($\Delta t$). SVC D sends a message once every four clock ticks. SVC E sends a message once during the seven clock ticks shown. The sequencer puts the messages from the several services in to a sequence, and dispatches them onto the network at the appropriate times.

As shown in FIG. 4A, all the services may be operating in the same time domain. As shown in FIG. 4B, however, the time domain for SVC C has been altered (e.g., slowed to half-speed). For example, rather than sending a message every two ticks, SVC C has been slowed to send a message every four ticks. The sequencer knows that SVC C is supposed to be sending messages out at half-rate and, therefore, places messages from SVC C into the sequence half as frequently. Thus, the sequencer may provide sequencing for any number of services, that are all running in the same time domain.

Resource Management Via Periodic Distributed Time

Figure 5:
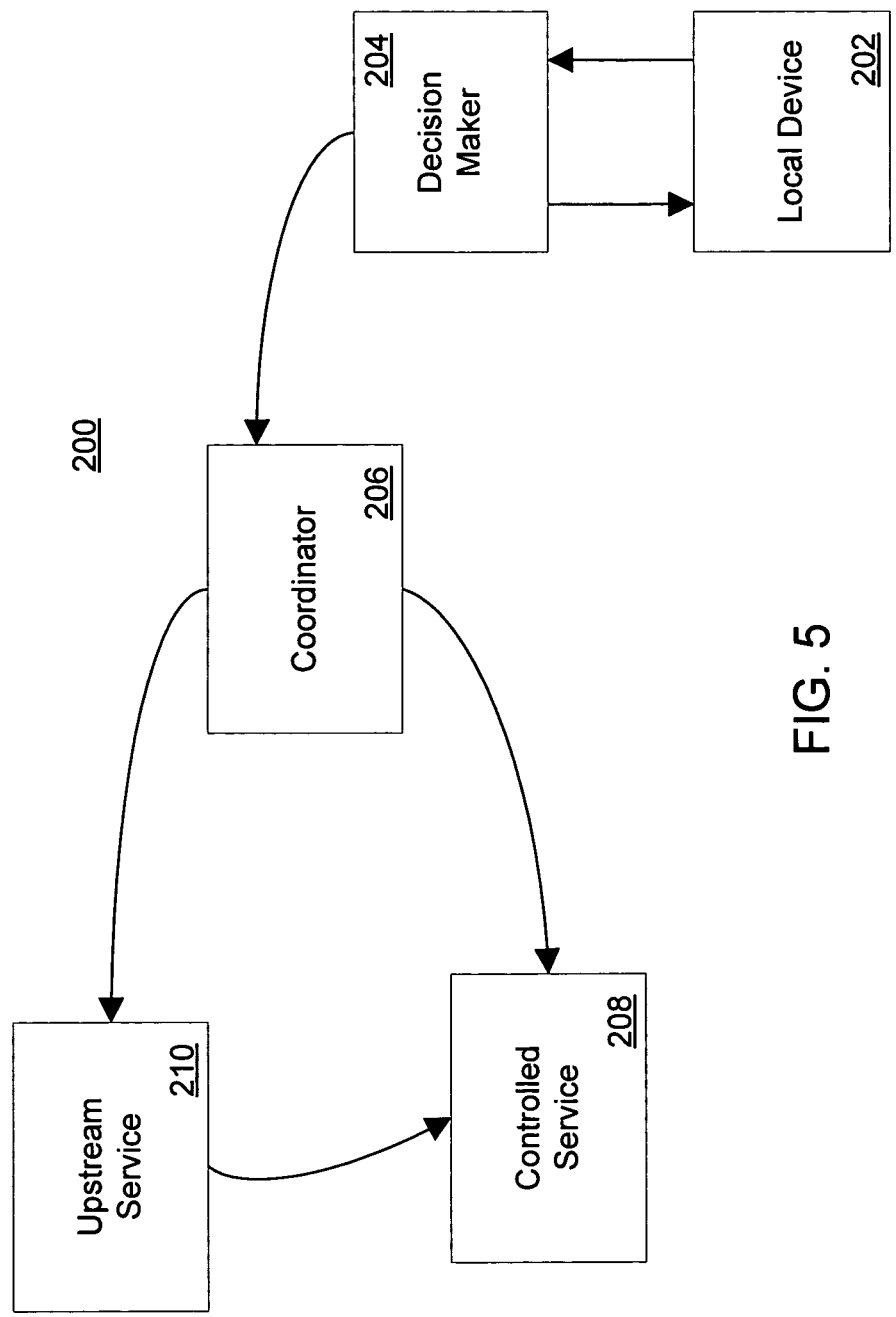
FIG. 5 is a functional flow diagram of an example system for managing device resources in a distributed network.

FIG. 5 is a functional flow diagram of an example system 200, and FIG. 6 is a flowchart of an example method 300, for managing device resources in a distributed network via periodic distributed time.

At step 302, the local device 202 detects a state change that affects a managed resource utilized by the device. Examples of such local devices include wireless phones, personal digital assistants ("PDAs"), laptop computers, desktop personal computers ("PCs"), etc. Examples of such state changes include a wireless phone or PDA being removed from its cradle, a laptop computer being unplugged, etc. Examples of such resources include, for example, battery life, network bandwidth, CPU utilization, etc.

At step 304, a service on the local device 202 may notify a decision-maker 204 of the state change. Though the service on the local device may notify the decision-maker using any message format, in an example embodiment, a web services application protocol (WSAP) NOTIFY operation is performed. WSAP, which is disclosed and claimed in U.S. patent application Ser. No. 10/856,399, the disclosure of which is incorporated herein by reference, defines a number of basic verbs relating to how state changes are observed and propagated. For example, WSAP defines a simple event notification model that is based on a NOTIFY operation. The NOTIFY operation may be used to report that a state change has occurred. Thus, the local device may expose its state so that other services distributed across the network can see it. The NOTIFY operation is described in greater detail in U.S. patent application Ser. No. 10/856,399.

A decision-maker may be associated with one or more managed resources, such as battery life, network bandwidth, CPU, etc. Preferably, a decision-maker is associated with only one managed resource, so there may be a different decision-maker for each resource. Accordingly, a local device may be in communication with any number of decision-makers. When a state change occurs at the local device, the local device 202 may notify all of the one or more decision-makers of the state change. The decision-maker 204 may be on the local device 202, or on any other network node, and may service any number of devices on the network.

The service on the device may notify the decision-maker without the decision-maker's asking to be notified, or the decision-maker 204 could "subscribe" to a particular event.

That is, the decision-maker 204 could tell the local device to notify it when that particular event occurs.

WSAP provides a SUBSCRIBE operation in which a subscriber issues a request to an event source. The request comprises a query that identifies the parts of the event notification source for which the subscriber is interested in seeing state changes. If the SUBSCRIBE operation is accepted, the event notification source initiates a NOTIFY operation that indicates the current state of the source. After this initial NOTIFY operation, the event notification source issues new NOTIFY operations whenever the state of the event notification source appropriately changes. Thus, a SUBSCRIBE operation may be used to subscribe to changes in the state of a service. The subscription may be limited by an expiration time, or may be terminated at any time using an UNSUBSCRIBE operation, wherein an unsubscriber sends and UNSUBSCRIBE operation to the event source to cancel further notifications. The SUBSCRIBE and UNSUBSCRIBE operations are described in greater detail in U.S. patent application Ser. No. 10/856, 399.

At step 306, the decision-maker 204 receives the state change notification and decides what, if anything, to do, based on the state change and the resource being managed. The decision-maker 204 may identify, based on the current state of the device and a resource management policy associated with a resource utilized by the device, a service that affects utilization of the resource.

For example, if the decision-maker is associated with managing battery life, then the decision-maker may determine how best to control the power being utilized by the local device (e.g., by controlling the rate at which messages are sent by or to the local device). If the resource being managed is network bandwidth, then the decision-maker may determine how best to control packet bandwidth (e.g., by controlling the rate at which packets are sent). If the resource being managed is CPU, then the decision-maker may determine how best to control power consumption and processing requirements (such as work item scheduling, for example).

After the decision-maker 204 decides what, if anything, to do, based on the state change and the resource being managed, the decision-maker 204 may, at step, 308, notify a coordinator 206 of what it wants to change. For example, suppose device B is a wireless device that has just been removed from its cradle. A service on device B may notify the decision-maker for controlling battery life that its state has changed. The decision-maker may then determine, based on a predefined resource management policy for control of battery life, that the device should be slowed down to, say, 10% of its nominal processing rate for issuing work items (i.e., how often it wakes up to do something and goes back to sleep again). Thus, when the device is plugged in, time may be scaled to real time and run at 100%. If it is operating on battery power, however, time may be scaled down to a lower percent. Thus, resource longevity (e.g., battery life) may be extended because the device is doing thing more slowly.

The decision-maker 204 may notify the coordinator 206 sending the coordinator 206 a message that indicates what actions the decision-maker 204 has decided should be taken to manage the resource appropriately based on the state of the local device and the resource management policy associated with the managed recourse. For example, the decision-maker 204 may send to the coordinator 206 a message indicating that the local device is in low power mode and that remote devices should throttle down the number or type of messages that they send to the local device.

At step 310, the coordinator 206 causes the actions to be taken. The coordinator 206 may send one or more messages to one or more devices in order to effect any changes precipitated by the decision made by the decision-maker 204. Such a message may include an identifier, such as a URI, associated with the local device. The device(s) receiving such messages from the coordinator may include the local device and any other device(s) on the network. Such a message may also include information that enables the device being commanded to understand what it is that the device needs to do (or not do) in order to comply with the coordinator's command. For example, the message may include rate information that enables the device being commanded to understand that the local device is in low power mode and, therefore, that remote devices should throttle down the rate at which messages are sent to the local device (by, for example, slowing time at the remote device for such message traffic).

The messages may be sent from the coordinator to the TimeManager which manages the associated time domain. The TimeManager will then inform subscribed Timekeepers of the rate change. This Timekeeper will then wake the sequencer associated with the affected service more or less frequently in order to increase or decrease the rate at which the affected service generates message traffic.

The coordinator 206 may also endeavor to coordinate "upstream" traffic in order to avoid a "traffic jam" anywhere on the network. That is, the coordinator 206 may send a message to an upstream device (a message sending device) to inform the upstream device that a downstream device (a message receiving device) is running slowly. The message may also include information, such as rate information, that enables the upstream device to understand that the upstream device should throttle down the rate at which messages are sent to the downstream device (again, for example, by slowing time at the upstream device for such message traffic).

A coordinator may be associated with a managed resource, such as battery life, network bandwidth, CPU, etc. Preferably, a coordinator is associated with only one managed resource, so there may be a different coordinator for each resource. Accordingly, a decision-maker may be in communication with only one coordinator, and one coordinator may be in communication with only one decision-maker. It should be understood, however, that a coordinator may be associated with more than one managed resource, that a decision-make may be associate with more than one managed resource, and, therefore, that any number of decision-makers may be in communication with any number of coordinators.

The coordinator can reside on the local device, or on any other network node. Thus, the local device could be the coordinator for itself, or it could delegate responsibility to another device to be the coordinator. Such delegation may be particularly desirable in low-power mode because it would enable the local device to send only one message (i.e., the delegation message), rather than all the messages required to coordinate the several remote devices.

Any device that is using, or causing to be used, the resource associated with the coordinator, may be made aware of the coordinator. The coordinator informs each device as to the rate at which things should be happening on that device. Thus, each device may have a consistent picture of the time domain.

Preferably, there is one time domain per managed resource. For example, there may be one time domain for managing battery usage for data storage, and other time domain for managing battery usage for bandwidth, battery usage for voice, data store usage for network, etc. Multiple time domain enable the system to keep different relative times. For example, a local device might be using voice-over-IP. Such a device may wish to give higher priority to voice than data if it is operating in a low-bandwidth environment. If the device is not being used to make phone calls at some particular time, then the device might wish to increase the bandwidth available for data. Decisions about what a local device wishes to do may depend on location, current power status, etc. Such decisions may change on a periodic or occasional basis. For example, every millisecond the device might reevaluate its state and notify the decision-maker. Each time domain may require at least one time manager and one timekeeper per node.

In addition, a "leaseholder" service may be provided in which services can be granted "leases" for a given time duration. If a service does not renew its lease once it expires, the service can be presumed dead and may be "garbage-collected" from other nodes' lists of available remote services.

According to an aspect of the invention, device resources may be controlled while at the same time ensuring that leases do not expire prematurely because different time domains are being employed. Because time may be running relatively slowly for a particular leased service on a particular device, the leased service may not renew its lease before it expires (as determined by a remote service running in a time domain that fast relative to the time domain in which the leased service is running). However, with all aspects of the lease running in the same time domain, the renewal rate may scale appropriately even as the time domain changes.

In accordance with an aspect of the invention, a first device, which may be a battery-powered device, for example, may wish to offload computation or storage to another device. In an example embodiment, services may be relocatable. Accordingly, offloading may be a simple process of deciding how many services to move and where to put them. Relocation may be enabled because all names may be globally addressable and all service states are observable. This means that any service can be stopped, its state saved, created in a new location, and replaced (with the saved version). Then, partner services may be informed of the new name, which may or may not have been changed.

Example Systems Employing Resource Management Via Periodic Distributed Time

Consider the example of a wireless telephone that is a member of a distributed storage network. Distributed storage networks are disclosed and claimed in co-pending U.S. patent application Ser. No. 11/110,128, filed on Apr. 20, 2005, entitled "Systems And Methods For Providing Distributed, Decentralized Data Storage And Retrieval," the disclosure of which is incorporated herein by reference. If the wireless phone is operating in a relatively high bandwidth environment (say, in its cradle), then the phone might be inclined to upload all the data at one time for distributed storage around the network. If the phone is operating in a wireless (and, consequently, low bandwidth) environment, however, it may choose to conserve battery life rather than uploading data, so that the battery is available for making phone calls rather than for data synchronization, which can be done later when the phone is back in its charger again.

In such an example, the phone may wish to inform the coordinator that is managing battery usage that the local device would like to operate at, say, 25% for data storage applications, at 70% broadband connectivity bandwidth, and at 100% for voice. The coordinator may then fan this information out to all devices that have some affiliation, directly or indirectly, with the phone. Thus, the coordinator can slow down the rate at which data synchronization is performed. It should be understood, of course, that resources may be prioritized according to any algorithm of interest to the local device.

In another example, a user may be using a laptop computer. Even if the laptop is plugged into a wall outlet, the user may wish to prioritize system resources. For example, while the user is working, the user may wish to have the computer devote additional processing power to the tool the user is using (e.g., a word processor). Background processes, for example, that are not of direct interest to the user can receive a lesser share of the processing resources while the user is working. If the user takes a break (the system detects that the HMI has been idle for a period of time), then additional resources can be allocated to performing the background tasks until the computer detects that the user has returned. Thus, the principles of the invention may be applied on a single device, and need not be applied across a network. In such an application, the decision-maker and coordinator would be resident on the local device.

Thus, there have been described systems and methods for distributed power management via periodic distributed time. Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A system comprising:
a processor; and
a memory coupled to the processor, the memory having stored thereon executable instructions that when executed by the processor cause the processor to effectuate operations comprising:
maintaining by a federated clock service at least a first time domain using a first representation of time relative to real time and a second time domain using a second representation of time relative to real time, wherein the first time domain is used to manage one or more resources utilized by one or more of a first plurality of devices assigned to the first time domain, and the second time domain is used to manage one or more resources utilized by one or more of a second plurality of devices assigned to the second time domain;
interacting by a resource utilization coordinator with the federated clock service to alter at least one time base in at least one of the first time domain or the second time domain in order to alter a rate at which at least one resource is utilized;
sequencing, using a sequencer interacting with the first time domain, timing events for the first time domain; and
sequencing, using the sequencer interacting with the second time domain, timing events for the second time domain;
wherein the federated clock service includes a timekeeper service that is used to place at least one of the first or the second time domain in a paused state relative to real time.

2. The system of claim 1, further comprising a timekeeper service that provides a timekeeper state comprising one or more values specifying a linear relationship between the timekeeper service and real time.

3. The system of claim 1, wherein a resource is associated with electrical power, and the resource utilization coordinator interacts with the federated clock service to alter at least one time base in order to alter a rate at which power is consumed by a device.

4. The system of claim 1, wherein the federated clock service comprises a base timekeeper service that places the first representation in one of a faster than, slower than, or same as real time provided to the base timekeeper via network time protocol.

5. The system of claim 1, further comprising:
a leaseholder service configured to grant at least one lease to at least one device in the first time domain, wherein the lease expires if not renewed.

6. The system of claim 5, wherein managing the one or more resources utilized by the plurality of devices assigned to the first time domain comprises ensuring that the at least one lease does not expire prematurely.

7. The system of claim 6, wherein ensuring that the at least one lease does not expire prematurely comprises ensuring that the at least one lease does not expire prematurely due to employment of the first representation of time.

8. The system of claim 1, further comprising:
a leaseholder service configured to grant a first lease to a first device in the first time domain and a second lease to a second device in the second time domain.

9. The system of claim 8, wherein managing the one or more resources comprises ensuring that at least one of the first or the second lease does not expire prematurely due to employment of the first and the second representation of time.

10. The system of claim 1, further comprising:
a time manager service that provides interaction between the first time domain and the second time domain and manages the first and the second representations of time using a master-slave configuration.

11. A method for managing resource utilization, the method comprising:
implementing a federation time policy by assigning a first plurality of devices to a first time domain, the first time domain configured to use a first representation of time derived by adjusting real time that is provided to a first base timekeeper service via network time protocol;
implementing the federation time policy by assigning a second plurality of devices to a second time domain, the second time domain configured to use a second representation of time derived by adjusting real time that is provided to a second base timekeeper service via network time protocol;
receiving information that provides an indication of a current state of a device;
identifying, based on the current state of the device and a resource management policy associated with a resource utilized by the device, a service that affects utilization of the resource;
altering at least one rate at which the service affects utilization of the resource, the altering carried out on the basis of the assignment of the device to at least one of the first or second time domain;
instantiating a sequencer for sequencing timing events for the first time domain; and
sequencing, using the sequencer, timing events for the second time domain;
wherein the federation time policy includes the first base or the second base timekeeper service that is used to place at least one of the first or the second time domain in a paused state relative to real time.

12. The method of claim 11, wherein altering the at least one rate comprises altering a rate at which the service generates messages.

13. The method of claim 12, wherein altering the at least one rate comprises altering a rate at which the service generates messages transmitted by the device.

14. The method of claim 11, wherein altering the at least one rate comprises altering a rate at which the service causes a central processing unit on the device to be utilized.

15. The method of claim 11, wherein altering the at least one rate comprises altering bandwidth utilized by the service.

16. The method of claim 11, wherein altering the at least one rate affects a plurality of services operating in a plurality of different time domains.

17. The system method of claim 11, wherein the resource is associated with electrical power, and altering the at least one rate affects battery utilization by the device.

18. A method for managing resource utilization on the basis of time domains, the method comprising:
assigning a first plurality of devices to a first time domain, the first time domain being a first representation of time derived by adjusting real time that is provided to a first base timekeeper service via a network time protocol;
assigning a second plurality of devices to a second time domain, the second time domain being a second representation of time derived by adjusting real time that is provided to a second base timekeeper service via the network time protocol;
detecting a change of a state of a device associated with the first time domain;
identifying a resource that is affected by the change of the state of the device;
affecting a rate at which the resource is utilized by using the first representation of time to alter a time base associated with a service that affects utilization of the resource;
scheduling, using a sequencer, timing events for the plurality of devices assigned to the first time domain; and
scheduling, using the sequencer, timing events for the second plurality of devices assigned to the second time domain;
placing at least one of the first or the second time domain in a paused state relative to real time using the first base or the second base timekeeper service.

19. The method of claim 18, further comprising:
identifying, based on the state of the device and a resource management policy associated with the resource, a service that affects utilization of the resource.

* * * * *